(12) United States Patent
Mayr et al.

(10) Patent No.: US 10,093,294 B2
(45) Date of Patent: Oct. 9, 2018

(54) HYDRAULIC BLOCK FOR A HYDRAULIC ASSEMBLY OF A SLIP CONTROL SYSTEM OF A HYDRAULIC VEHICLE BRAKE SYSTEM

(71) Applicant: Robert Bosch GmbH, Stuttgart (DE)

(72) Inventors: Matthias Mayr, Rettenberg (DE); Andreas Weh, Sulzberg (DE)

(73) Assignee: Robert Bosch GmbH, Stuttgart (DE)

(*) Notice: Subject to any disclaimer, the term of this patent is extended or adjusted under 35 U.S.C. 154(b) by 14 days.

(21) Appl. No.: 15/310,529

(22) PCT Filed: Mar. 12, 2015

(86) PCT No.: PCT/EP2015/055185
§ 371 (c)(1),
(2) Date: Nov. 11, 2016

(87) PCT Pub. No.: WO2015/172908
PCT Pub. Date: Nov. 19, 2015

(65) Prior Publication Data
US 2017/0072925 A1    Mar. 16, 2017

(30) Foreign Application Priority Data
May 12, 2014    (DE) .......................... 10 2014 208 871

(51) Int. Cl.
*B60T 8/36*    (2006.01)

(52) U.S. Cl.
CPC .................................... *B60T 8/368* (2013.01)

(58) Field of Classification Search
CPC . B60T 8/36; B60T 8/368; B60T 13/12; B60T 13/686; B60T 17/04; F15B 13/0803; F15B 9/09
(Continued)

(56) References Cited

U.S. PATENT DOCUMENTS

| 8,523,295 B2 * | 9/2013 | Bareiss | B60T 8/368 |
| | | | 303/119.3 |
| 9,022,489 B2 * | 5/2015 | Weh | B60T 8/368 |
| | | | 303/119.3 |

(Continued)

FOREIGN PATENT DOCUMENTS

| CN | 103448711 A | 12/2013 |
| DE | 10 2005 046 630 A1 | 4/2007 |

(Continued)

OTHER PUBLICATIONS

International Search Report corresponding to PCT Application No. PCT/EP2015/055185, dated May 13, 2015 (German and English language document) (8 pages).

*Primary Examiner* — Christopher P Schwartz
(74) *Attorney, Agent, or Firm* — Maginot, Moore & Beck LLP

(57) ABSTRACT

A hydraulic block for a hydraulic assembly of a slip control system for a hydraulic vehicle brake system includes a mount for a brake circuit pressure sensor in a flat side of the hydraulic block. The mount for the brake circuit pressure sensor is configured to measure pressure in at least one brake circuit of the vehicle brake system and communicates with a connecting line through a transverse line and a vertical line. The connecting line connects a mount for a brake pressure build-up valve to a mount for an isolating valve. The hydraulic block further includes a mount for a master brake cylinder pressure sensor and a mount for a brake circuit pressure sensor for each brake circuit.

7 Claims, 3 Drawing Sheets

(58) Field of Classification Search
USPC .............. 303/3, 7, 113.1–113.5, 116.1–116.4, 303/119.1, 119.3
See application file for complete search history.

(56) References Cited

U.S. PATENT DOCUMENTS

| | | | |
|---|---|---|---|
| 9,592,808 B2 * | 3/2017 | Schlitzkus | .............. B60T 8/368 |
| 2012/0139333 A1 | 6/2012 | Terashima | |
| 2013/0049449 A1 * | 2/2013 | Watanabe | ................. B60T 1/10 |
| | | | 303/3 |
| 2013/0319562 A1 * | 12/2013 | Weh | .................... F15B 13/0803 |
| | | | 137/884 |
| 2014/0345720 A1 * | 11/2014 | Alaze | ...................... B60T 8/368 |
| | | | 137/561 A |
| 2014/0366524 A1 * | 12/2014 | Schlitzkus | .............. B60T 8/368 |
| | | | 60/591 |
| 2015/0298675 A1 * | 10/2015 | Mayr | ...................... B60T 8/368 |
| | | | 92/169.1 |
| 2015/0314760 A1 * | 11/2015 | Weh | ........................ B60T 8/368 |
| | | | 137/884 |
| 2015/0321650 A1 * | 11/2015 | Schlitzkus | .............. B60T 8/368 |
| | | | 137/78.1 |
| 2016/0280197 A1 * | 9/2016 | Mayr | ...................... B60T 17/04 |

FOREIGN PATENT DOCUMENTS

| | | |
|---|---|---|
| DE | 10 2007 054 697 A1 | 6/2008 |
| DE | 10 2011 087 809 A1 | 6/2012 |
| DE | 10 2012 209 218 A1 | 12/2013 |
| JP | 2002-283988 A | 10/2002 |
| JP | 2008-30552 A | 2/2008 |
| JP | 2012-121341 A | 6/2012 |
| JP | 2013-249055 A | 12/2013 |
| WO | 2009/047099 A1 | 4/2009 |

\* cited by examiner

HYDRAULIC BLOCK FOR A HYDRAULIC ASSEMBLY OF A SLIP CONTROL SYSTEM OF A HYDRAULIC VEHICLE BRAKE SYSTEM

This application is a 35 U.S.C. § 371 National Stage Application of PCT/EP2015/055185, filed on Mar. 12, 2015, which claims the benefit of priority to Serial No. DE 10 2014 208 871.2, filed on May 12, 2014 in Germany, the disclosures of which are incorporated herein by reference in their entirety.

BACKGROUND

The disclosure concerns a hydraulic block for a hydraulic assembly of a slip control system of a hydraulic vehicle brake system with the features of the disclosure.

Slip control systems of hydraulic vehicle brake systems comprise hydraulic assemblies with hydraulic components of the slip control system. Such hydraulic components are solenoid valves, non-return valves, hydraulic pumps, hydraulic reservoirs, damping chambers and chokes. Such hydraulic assemblies comprise hydraulic blocks for mechanical attachment. The hydraulic blocks are usually flat rectangular metal blocks, for example made of an alloy of aluminum. Receptacles for the hydraulic components are fitted in the hydraulic blocks, being typically implemented as stepped diameter blind bores into which the hydraulic components are plugged, pressed or installed in another way and for example fixed by caulking. Lines are made by drilling the hydraulic block and predominantly run parallel to the edges of the hydraulic block, i.e. orthogonally, and the receptacles or the hydraulic components installed therein are connected to each other hydraulically. A hydraulic block populated by the hydraulic components of the slip control system can be regarded as a hydraulic assembly. The hydraulic block or the hydraulic assembly is connected to a master brake cylinder by means of brake lines and hydraulic wheel brakes are connected to the hydraulic assembly or the hydraulic block by means of brake lines.

For a slip control system with twelve solenoid valves, namely four brake pressure build-up valves, four brake pressure reducing valves, two isolating valves and two intake valves, it is known to provide the receptacles for the solenoid valves juxtaposed in three mutually parallel rows for four valves each. The receptacles for the brake pressure build-up valves are disposed in a first row, the receptacles for the brake pressure reducing valves are disposed in a second row and the receptacles for the isolating valves and the intake valves are disposed in a third row. The brake pressure build-up valves are also referred to as inlet valves and the brake pressure reducing valves are also referred to as outlet valves.

SUMMARY

The hydraulic block according to the disclosure comprises a receptacle for a brake circuit pressure sensor that is used to measure a pressure in a brake circuit of a hydraulic vehicle brake system comprising a slip control system. The receptacle for the brake circuit pressure sensor is disposed on a side of the receptacles for the isolating valves or the intake valves facing away from the receptacles for the brake pressure reducing valves. In other words: the receptacle for the brake circuit pressure sensor is disposed outside the three rows of the receptacles for the solenoid valves, and indeed on the side of the third row with the receptacles for the isolating valves and the intake valves. The receptacle for the brake circuit pressure sensor communicates with a connecting line leading from a receptacle for an isolating valve to a receptacle for a brake pressure build-up valve. The connecting line is a bore arranged in the hydraulic block or is made in another way, being referred to here as a connecting line for the positive identification thereof.

The subordinate claims have advantageous configurations and developments of the disclosure.

When viewed from the direction of the receptacle for the brake pressure build-up valve, the connecting line preferably extends across the receptacle for an isolating valve. A vertical line that connects the receptacle for the brake circuit pressure sensor to the connecting line opens into the connecting line on a side of the receptacle for the isolating valve facing away from the receptacle for the brake pressure build-up valve. The vertical line is also a bore arranged in the hydraulic block or is made as through bores in another way. It is referred to here as a vertical line, since it preferably runs perpendicular to flat sides of the hydraulic block. The designation as a vertical line also serves to provide a unique identification. It runs vertically if the hydraulic block is disposed with horizontal flat sides.

A development of the disclosure provides a transverse line that opens into the vertical line and connects the receptacle for the brake circuit pressure sensor to the vertical line. The designation as a transverse line refers to the fact that the transverse line usually runs perpendicular to a central longitudinal plane of the hydraulic block. It also provides a positive designation of the line and as with the other line designations is not intended to be restrictive.

The hydraulic block according to the disclosure preferably comprises a receptacle for a brake circuit pressure sensor with a respective connecting line for each brake circuit, i.e. two receptacles for two brake circuit pressure sensors and two connecting lines.

BRIEF DESCRIPTION OF THE DRAWINGS

The disclosure is described in detail below using an embodiment. In the figures.

Further features of the disclosure are revealed by the following description of an embodiment of the disclosure in combination with the claims and the figures. The individual features can each be implemented on their own or collectively in any combination in embodiments of the disclosure.

DETAILED DESCRIPTION

Figure 1:
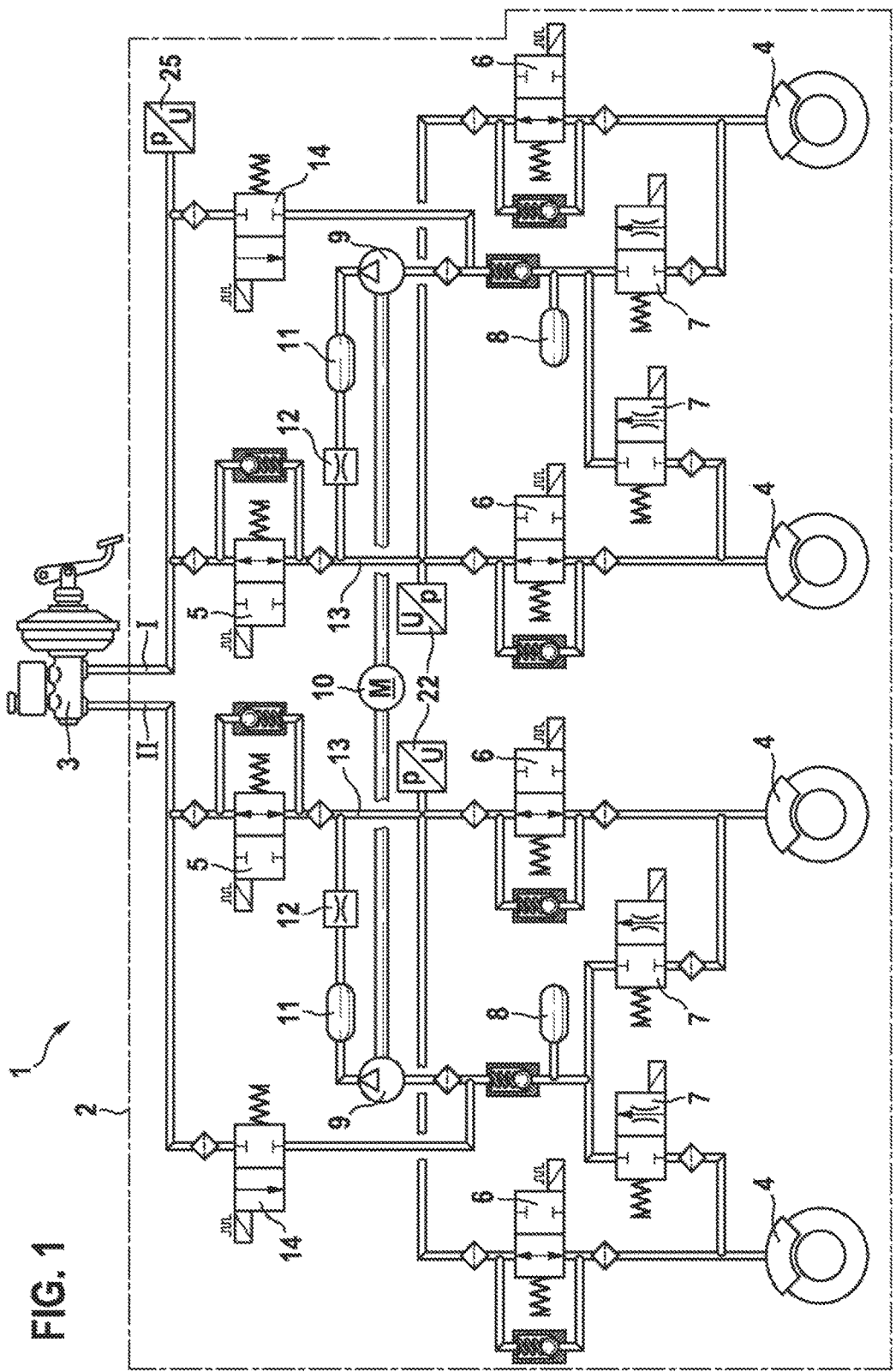
FIG. 1 shows a hydraulic circuit diagram of a slip-regulated hydraulic vehicle brake system.

The slip-regulated hydraulic dual circuit vehicle brake system 1 shown in FIG. 1 comprises a hydraulic assembly 2, a dual circuit master brake cylinder 3 to which the hydraulic assembly 2 is connected and wheel brakes 4 that are connected to the hydraulic assembly 2. The hydraulic assembly 2 comprises the hydraulic components of a slip control system of the vehicle brake system 1 that are mentioned in the following paragraph.

Each brake circuit I, II of the vehicle brake system 1 is connected to the master brake cylinder 3 by means of an isolating valve 5. The wheel brakes 4 are connected to the isolating valves 5 by means of brake pressure build-up valves 6. In each brake circuit I, II a hydraulic reservoir 8 and a suction side of a hydraulic pump 9 are connected to the wheel brakes 4 by means of brake pressure reducing valves 7. The two hydraulic pumps 9, which are often also referred to as return feed pumps, are commonly driven by an electric motor 10. Damping chambers 11 are connected to the pressure sides of the hydraulic pumps, being connected by chokes 12 to connecting lines 13 that connect the isolating valves 5 and the brake pressure build-up valves 6. Moreover, the vehicle brake system 1 comprises in each brake circuit I, II an intake valve 14 that connects the suction sides of the hydraulic pumps 9 to the master brake cylinder 3. The design and function of such slip-regulated vehicle brake systems 1 are known and will not be described in detail here. The brake pressure build-up valves 6, brake pressure reducing valves 7, isolating valves 5 and intake valves 14 are solenoid valves.

Figure 2:
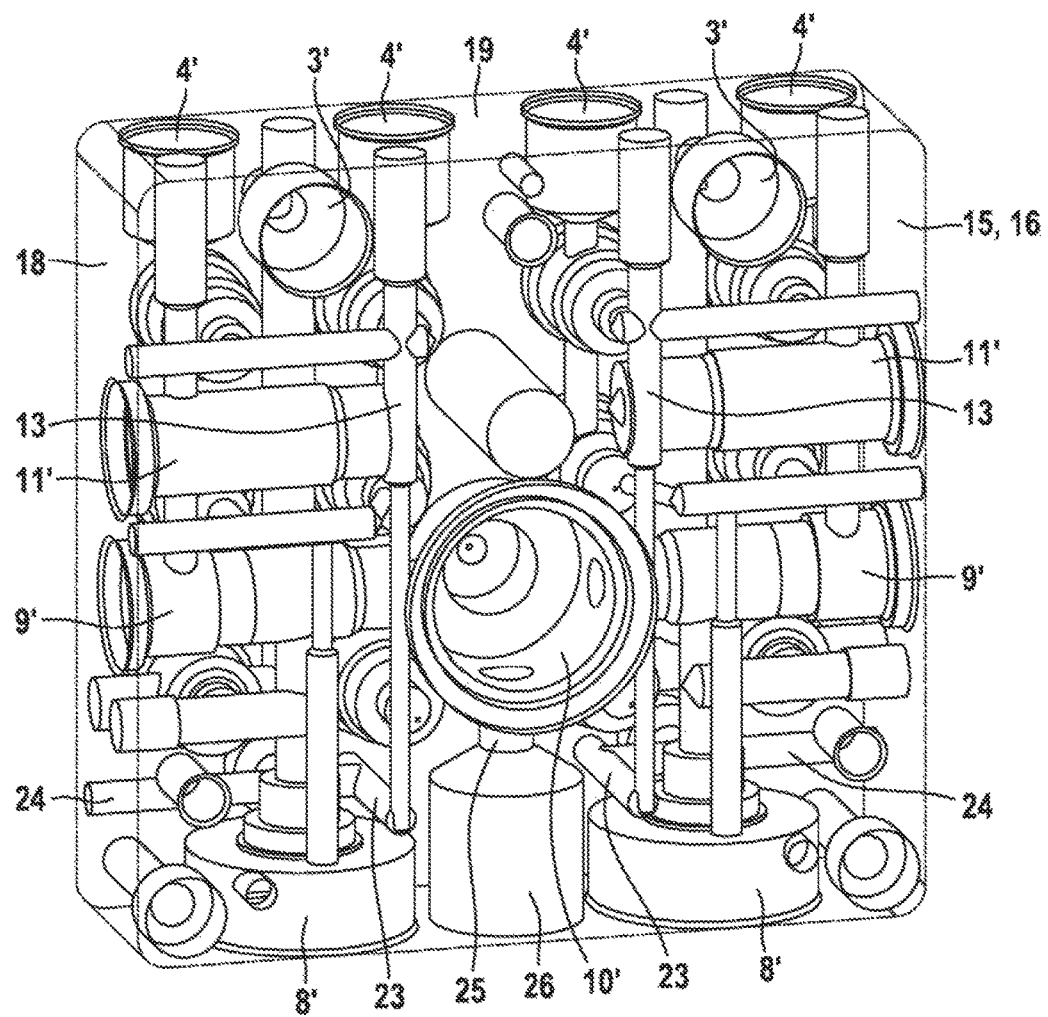
FIG. 2 shows a hydraulic block according to the disclosure in a perspective representation with a view of a valve side.
Figure 3:
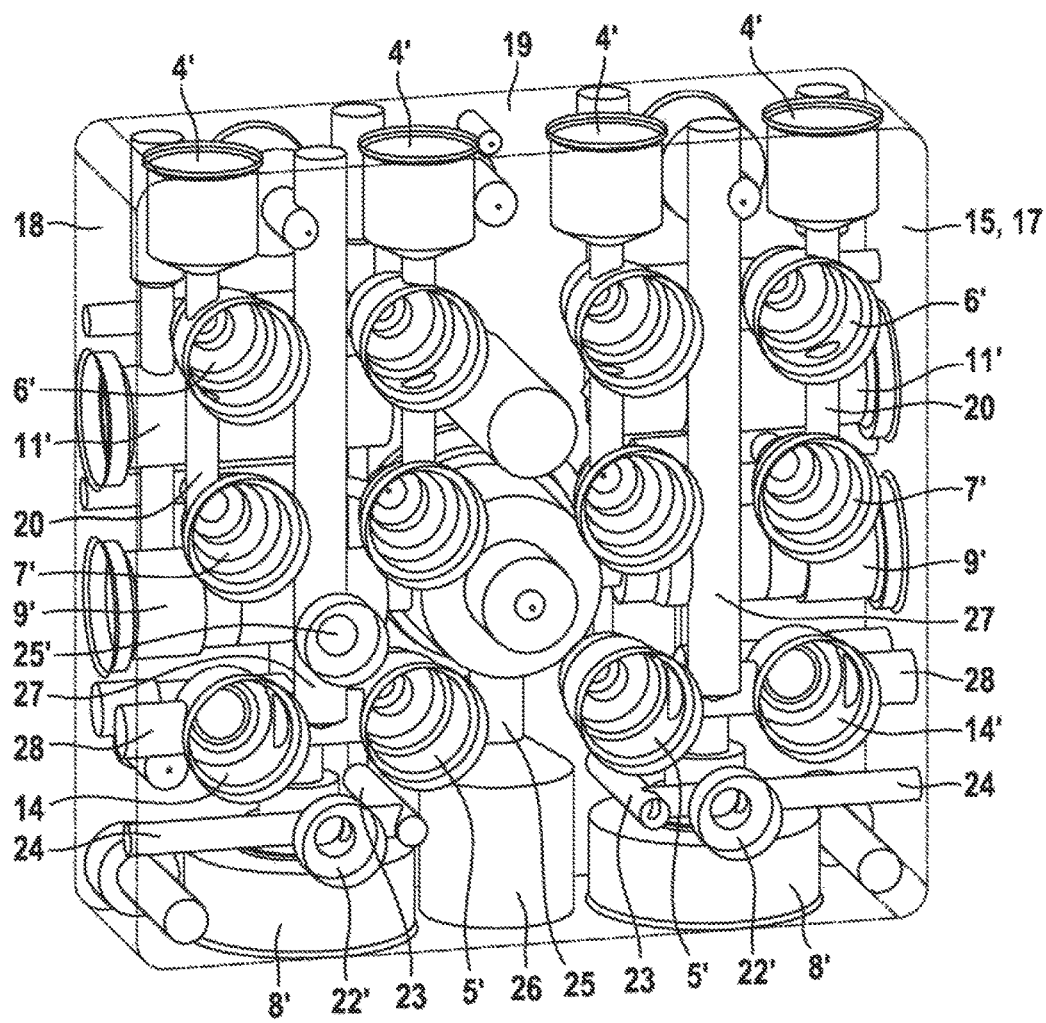
FIG. 3 shows the hydraulic block of FIG. 2 in a perspective representation with a view of a motor side.

The hydraulic components of the hydraulic assembly 2 of the slip control system of the vehicle brake system 1 are housed in a hydraulic block 15 that is shown in FIGS. 2 and 3. The hydraulic block 15 provides a mechanical attachment and hydraulic interconnection of the hydraulic components of the hydraulic assembly 2 or the slip control system of the vehicle brake system 1. Hydraulic parts of the components are disposed in receptacles, installation spaces and similar of the hydraulic block 15, electrotechnical and electromechanical parts such as coils and armatures of the solenoid valves are disposed outside of the hydraulic block 15. The electric motor 10 for driving the hydraulic pumps 9 is mounted on the outside of a flat side of the hydraulic block 15, which is referred to here as the motor side 16. The hydraulic block 15 is shown transparent and unpopulated, i.e. without the hydraulic components. The receptacles are cylindrical, partly stepped diameter blind bores in the hydraulic block 15. For hydraulic interconnection, bores are arranged as connecting lines or in general as lines in the hydraulic block 15. The hydraulic block 15 is orthogonally drilled, i.e. the receptacles, installation spaces and lines are drilled parallel or perpendicular to each other and to the sides of the hydraulic block 15. The hydraulic block 15 is a low cuboid with the thickness thereof approximately one quarter of the length or breadth thereof, in view it is almost square. For a positive designation and distinction, the flat side of the hydraulic block 15 to be seen in FIG. 2 is referred to as the motor side 16, the opposite flat side to be seen in FIG. 3 as the valve side 17 and the lateral surfaces as longitudinal sides 18 and lateral sides 19. The hydraulic block 15 is mirror-symmetrical to an imaginary central longitudinal plane that runs parallel to the longitudinal sides 18.

The hydraulic block 15 comprises four connections 4' for the wheel brakes 4 on a lateral side 19 that are disposed next to each other in a row. "In a row" means that the connections 4', receptacles etc. are disposed adjacent to each other on an imaginary straight line. The connections 4' are cylindrical blind holes, from which at least one line 20 leads to other connections, receptacles for solenoid valves, installation spaces for hydraulic pumps, hydraulic reservoirs and/or damping chambers. The lines 20 are bores in the hydraulic block 15, which, if they do not start from a connection, a receptacle or an installation space, are hermetically sealed closed at an opening on one of the sides 16, 17, 18, 19 of the hydraulic block 15, for example with a pressed-in ball. The connections 4' can comprise internal threads for the connection of wheel brake lines or can be provided for caulking, for example for crimping to the connection of the wheel brake lines. Disposed on the lateral side 19 of the hydraulic block 15 means that the connections 4' are open on said lateral side 19, so that the wheel brake lines can be connected. The installation spaces for the hydraulic pumps and hydraulic reservoirs being disposed on one side of the hydraulic block 15 means that the installation spaces are open on said side of the hydraulic block 15, so that the hydraulic pumps or hydraulic reservoirs can be inserted or installed from said side. The same applies to the receptacles of the solenoid valves.

Two connections 3' for the two brake circuits I, II of the master brake cylinder 3 are disposed on the motor side 16 of the hydraulic block 15 at a distance from the lateral side 19 of the hydraulic block 15 corresponding approximately to the depth of the connections 4' for the wheel brakes 4. The connections 3' for the master brake cylinder 3 are each disposed between an outer and an inner connection 4' for the wheel brakes 4, wherein "outer" means near a longitudinal side 18 and "inner" means near the central longitudinal plane of the hydraulic block 15.

Four receptacles 6' for the brake pressure build-up valves 6 connecting to the connections 3' for the master brake cylinder 3 are disposed adjacent to each other in a first row on the valve side of the hydraulic block 15. The receptacles 6' for the brake pressure build-up valves 6 are connected to the connections 4' for the wheel brakes 4 by means of the aforementioned lines 20.

In a second row parallel to the receptacles 6' for the brake pressure build-up valves 6, connections 7' for the brake pressure reducing valves 7 are disposed adjacent to each other on the valve side 16 of the hydraulic block 15 on the side of the receptacles 6' for the brake pressure build-up valves 6 facing away from the connections 4' for the wheel brakes 4.

Installation spaces 9' for the hydraulic pumps 9, which are disposed on the longitudinal sides 18 of the hydraulic block 15, i.e. which are open and which run parallel to the rows of the juxtaposed receptacles 6', 7' for the brake pressure build-up valves 6 and the brake pressure reducing valves 7, are connected to the receptacles 7' for the brake pressure reducing valves 7. The installation spaces 9' for the hydraulic pumps 9 are disposed approximately at a central height between the motor side 16 and the valve side 17 and reach relatively deep into the hydraulic block 15 in the direction of the longitudinal center of the hydraulic block 15 and, following two diameter steps that reduce the diameter thereof, open radially into an eccentric space 10' for a pump cam that is not shown here and that is rotationally fixedly disposed on a shaft of the electric motor 10 that drives the hydraulic pumps 9 that are in the form of piston pumps. The eccentric space 10' is open on the motor side 16 of the hydraulic block 15 and is disposed in the longitudinal center of the hydraulic block 15 between the installation spaces 9' for the hydraulic pumps 9. The (not shown) electric motor 10 is mounted externally on the motor side 16 of the hydraulic block 15 coaxial to the eccentric space 10'.

In a third row parallel to the rows of receptacles 6', 7' for the brake pressure build-up valves 6 and for the brake pressure reducing valves 7, four receptacles 5', 14' for the isolating valves 5 and the intake valves 14 are disposed adjacent to each other on the valve side of the hydraulic block 15 on a side of the installation spaces 9' for the hydraulic pumps 9 facing away from the receptacles 6', 7' for the brake pressure build-up valves 6 and brake pressure reducing valves 7. The receptacles 5' for the isolating valves 5 are disposed on the inside between the receptacles 14' for the intake valves 14 that are disposed on the outside.

Two installation spaces 8' for the hydraulic reservoirs 8 are close to the third row of the receptacles 5', 14' for the isolating valves 5 and the intake valves 14. The installation spaces 8' are disposed on a lateral side 19 of the hydraulic block 15 that lies opposite to the lateral side 19 on which the connections 4' for the wheel brakes 4 are disposed.

Two installation spaces 11' for the damping chambers 11 are disposed between the two rows of receptacles 6', 7' for the brake pressure build-up valves 6 and the brake pressure reducing valves 7. The installation spaces 11' for the damping chambers 11 are disposed on the longitudinal sides 18 of the hydraulic block 15, i.e. they are open at that point for the installation of the damping chambers 11, and they run parallel to the rows of installation spaces 6', 7' for the brake pressure build-up valves 6 and the brake pressure reducing valves 7. The receptacles 6', 7' for the brake pressure build-up valves 6 and the brake pressure reducing valves 7 are disposed on the valve side 16 of the hydraulic block 15 as stated. The installation spaces 11' for the damping chambers 11 are disposed in the hydraulic block 15 near the motor side 16 of the hydraulic block 15, thus below the receptacles 6', 7' for the brake pressure build-up valves 6 and the brake pressure reducing valves 7 when viewed from the valve side 11 of the hydraulic block 15.

A master brake cylinder pressure sensor 21 is connected in one of the two brake circuits I. A brake circuit pressure sensor 22 is connected between the isolating valve 5 and the brake pressure build-up valves 6 in each of the two brake circuits I, II (FIG. 1).

In the hydraulic block 15, the connecting lines 13 are bores parallel to the longitudinal sides 18, starting from the lateral side 19 comprising the connections 4' for the wheel brakes 4. The connecting lines 13 run through below the inner receptacles 6' for the brake pressure build-up valves 6 and the receptacles 5' for the isolating valves 5, i.e. between the bottom of said receptacles 6', 5' and the motor side 16, and continue over the receptacles 5' for the isolating valves 5 when viewed from the direction of the receptacles 6' for the brake pressure build-up valves 6. Vertical lines 24 opening into the ends of the connecting lines 13 are arranged in the hydraulic block 15 perpendicular to the motor side 16 between the receptacles 8' for the hydraulic reservoirs 8 and the receptacles 5' for the isolating valves 5. Openings of the vertical lines 23 on the motor side 16 of the hydraulic block 25 are closed hermetically pressure-tight with pressed-in balls. Transverse lines 24 lead to the vertical lines 23 from the longitudinal sides 18 of the hydraulic block 15. The openings of the transverse lines 24 are also closed hermetically pressure-tight on the longitudinal sides 18 of the hydraulic block 15 by pressed-in balls. Receptacles 22' for the brake circuit pressure sensors 22 fitted in the valve side 17 of the hydraulic block 15 communicate with the transverse lines 24. The receptacles 22' for the brake circuit pressure sensors 22 can basically be disposed at any point of the transverse lines 24. In the embodiment of the disclosure represented, the receptacles 22' for the brake circuit pressure sensors 22 are disposed between the receptacles 5' for the isolating valves 5 and the receptacles 14' for the intake valves 14 when looking in the lateral direction of the hydraulic block 17. Looking in the longitudinal direction of the hydraulic block 15, the receptacles 22' for the brake circuit pressure sensors 22 are disposed outside the three rows of receptacles 6', 7', 5', 14' for the brake pressure build-up valves 6, brake pressure reducing valves 7, isolating valves 5 and intake valves 14 on the side of the receptacles 5', 14' for the isolating valves 5 and the intake valves 14, i.e. the receptacles 22' for the brake circuit pressure sensors 22 are disposed between the receptacles 5', 14' for the isolating valves 5 and intake valves 14 on the one hand and the installation spaces 8' for the hydraulic reservoirs 8 on the other hand when looking in the longitudinal direction of the hydraulic block 15. Looking in the lateral direction of the hydraulic block 15, the receptacles 22' for the brake circuit pressure sensors 22 can also be disposed in the region of the vertical lines 23, whereby the transverse lines 24 can be omitted (not shown).

Instead of the eccentric space 10', the hydraulic block 15 can comprise an installation space for two internal gear pumps, which act as hydraulic pumps for the two brake circuits I, II of the vehicle brake system 1 instead of the piston pumps (not shown). A leakage line 25 leads from the eccentric space 10' in the central longitudinal plane of the hydraulic block 17 to the lateral side 19 comprising the installation spaces 8' for the hydraulic reservoirs 8. The leakage line 25 can open into the surroundings or, as in the embodiment, into a leakage accumulator 26. The leakage line 25 guides any brake fluid that flows out of the hydraulic pumps 9 and into the eccentric space 10' out of the eccentric space 10'.

Master brake cylinder lines 27 run through from the two connections 3 of the master brake cylinder 3 for the two brake circuits I, II parallel to the longitudinal sides 18 of the hydraulic block 15 and near the valve side 17 between respective outer and inner receptacles 6', 7' for the brake pressure build-up valves 6 and the brake pressure reducing valves 7 to between the receptacles 5', 14' for the isolating valves 5 and the intake valves 14, to which the master brake cylinder lines 27 are connected by means of transverse lines 28. A receptacle 25' for the master brake cylinder pressure sensor 25 is disposed in the valve side 17 of the hydraulic block 15 on one side of the hydraulic block 15 between an inner and an outer receptacle 7' for the brake pressure reducing valves 7 and the receptacles 5', 14' for an isolating valve 5 and an intake valve 14. The receptacle 15' is disposed above or on the master brake cylinder line 27 and communicates with the same, so that master brake cylinder pressure in a brake circuit I can be measured. Receptacles 25' for master brake cylinder pressure sensors 25 for both brake circuits I, II are possible but are not provided.

In the longitudinal center between two inner receptacles 6' for the brake pressure build-up valves 6 and two inner receptacles 7' for brake pressure reducing valves 7, the hydraulic block 15 comprises a continuous through hole from the motor side 16 to the valve side 17 as a lead-through 29 to an electrical connection of the electric motor 10. The lead-through enables the electrical connection of the electric motor 10 on the same side, namely the valve side 17 of the hydraulic block 15, on which the solenoid valves 5, 6, 7, 14 are disposed. As a result, all electrical connections of the hydraulic assembly 2 are disposed on the same side of the hydraulic block 15.

The invention claimed is:

1. A hydraulic block for a hydraulic assembly of a slip control system of a hydraulic vehicle brake system, comprising:
a first row of receptacles for brake pressure build-up valves, the first row including a first brake pressure build-up valve receptacle;
a second row of receptacles for brake pressure reducing valves;
a third row of receptacles for isolating valves and intake valves, the third row including a first isolating valve receptacle;
a connecting line that leads from the first isolating valve receptacle to the first brake pressure build-up valve receptacle; and a receptacle for a brake circuit pressure sensor that is disposed on an opposite side of the third row from the second row and that communicates with the connecting line, wherein the connecting line is a straight line bored in from an outer surface of the hydraulic block.

2. The hydraulic block according to claim 1, further comprising:

a vertical line that opens into the connecting line, wherein, when viewed from direction of a surface in which the receptacles for the brake pressure build-up valves are defined, the connecting line passes behind the first isolating valve receptacle and, at a position that is on the opposite side of the third row from the second row, the vertical line opens into the connecting line in such a way that the receptacle for the brake circuit pressure sensor communicates with the connecting line via the vertical line.

3. The hydraulic block according to claim 2, further comprising a transverse line that opens into the vertical line, the receptacle for the brake circuit pressure sensor communicating with the connecting line via the transverse line and the vertical line.

4. A hydraulic block for a hydraulic assembly of a slip control system of a hydraulic vehicle brake system, comprising:

a first row of receptacles for brake pressure build-up valves, the first row including a first brake pressure build-up valve receptacle;

a second row of receptacles for brake pressure reducing valves;

a third row of receptacles for isolating valves and intake valves, the third row including a first isolating valve receptacle;

a connecting line that leads from the first isolating valve receptacle to the first brake pressure build-up valve receptacle; and a receptacle for a brake circuit pressure sensor that is disposed on an opposite side of the third row from the second row and that communicates with the connecting line, wherein:

the hydraulic block defines an eccentric space for an eccentric element configured to drive two hydraulic pumps, the eccentric space disposed in a longitudinal center of the hydraulic block, and a leakage line leads from the eccentric space to an external side of the hydraulic block.

5. The hydraulic block according to claim 4, wherein the eccentric space is disposed between the second row of receptacles for the brake pressure build-up valves and the third row of receptacles for the isolating valves and the intake valves.

6. The hydraulic block according to claim 4, wherein the leakage line runs in the longitudinal center of the hydraulic block.

7. A hydraulic block for a hydraulic assembly of a slip control system of a hydraulic vehicle brake system, comprising:

a first row of receptacles for brake pressure build-up valves, the first row including a first brake pressure build-up valve receptacle;

a second row of receptacles for brake pressure reducing valves;

a third row of receptacles for isolating valves and intake valves, the third row including a first isolating valve receptacle;

a connecting line that leads from the first isolating valve receptacle to the first brake pressure build-up valve receptacle;

a receptacle for a brake circuit pressure sensor that is disposed on an opposite side of the third row from the second row and that communicates with the connecting line;

a connection for a master brake cylinder;

a master brake cylinder line that passes from the connection for the master brake cylinder through between two receptacles for the brake pressure build-up valves and two receptacles for the brake pressure reducing valves to between the first isolating valve receptacle and a first intake valve receptacle of the third row; and a receptacle for a master brake cylinder pressure sensor between the two receptacles for the brake pressure reducing valves, the first isolating valve receptacle, and the first intake valve receptacle, the receptacle for the master brake cylinder pressure sensor communicating with the master brake cylinder line via a transverse line.

* * * * *